United States Patent
La Grutta

[15] 3,659,995
[45] May 2, 1972

[54] COINING STRUCTURES FOR INJECTION-BLOW MOULDING APPARATUS

[72] Inventor: Pascal A. La Grutta, West Caldwell, N.J.

[73] Assignee: Container Corporation of America, Chicago, Ill.

[22] Filed: Dec. 17, 1969

[21] Appl. No.: 885,721

[52] U.S. Cl. .............................. 425/242, 425/317, 425/326
[51] Int. Cl. ......................................................... B29d 23/03
[58] Field of Search ..................................... 18/5 B, 30 LA

[56] References Cited

UNITED STATES PATENTS

| | | | |
|---|---|---|---|
| 3,339,231 | 9/1967 | Piotrowski | 18/5 BJ |
| 3,341,043 | 9/1967 | Santelli | 18/5 BM UX |
| 3,488,805 | 1/1970 | Biglin et al. | 18/5 BM |
| 2,115,590 | 4/1938 | Ryder | 18/30 LA |
| 3,387,324 | 6/1968 | Valyi | 18/5 BJ |
| 3,470,282 | 9/1969 | Scalora | 18/5 BA X |

FOREIGN PATENTS OR APPLICATIONS 387,884  5/1965  Switzerland ..................... 18/30 LA Primary Examiner—J. Spencer Overholser
Assistant Examiner—Michael O. Sutton
Attorney—Carpenter, Ostis & Lindberg

[57] ABSTRACT

An injection-blow moulding apparatus characterized by structure at the blow moulding station for coining a surface of the blown parison before it is removed from the blow mould cavity. The coining step is achieved by cooperating cam members, one being fixed to the moving stack of the apparatus, and the other cam member being movable relative to such stack.

1 Claims, 1 Drawing Figure

PATENTED MAY 2 1972 3,659,995
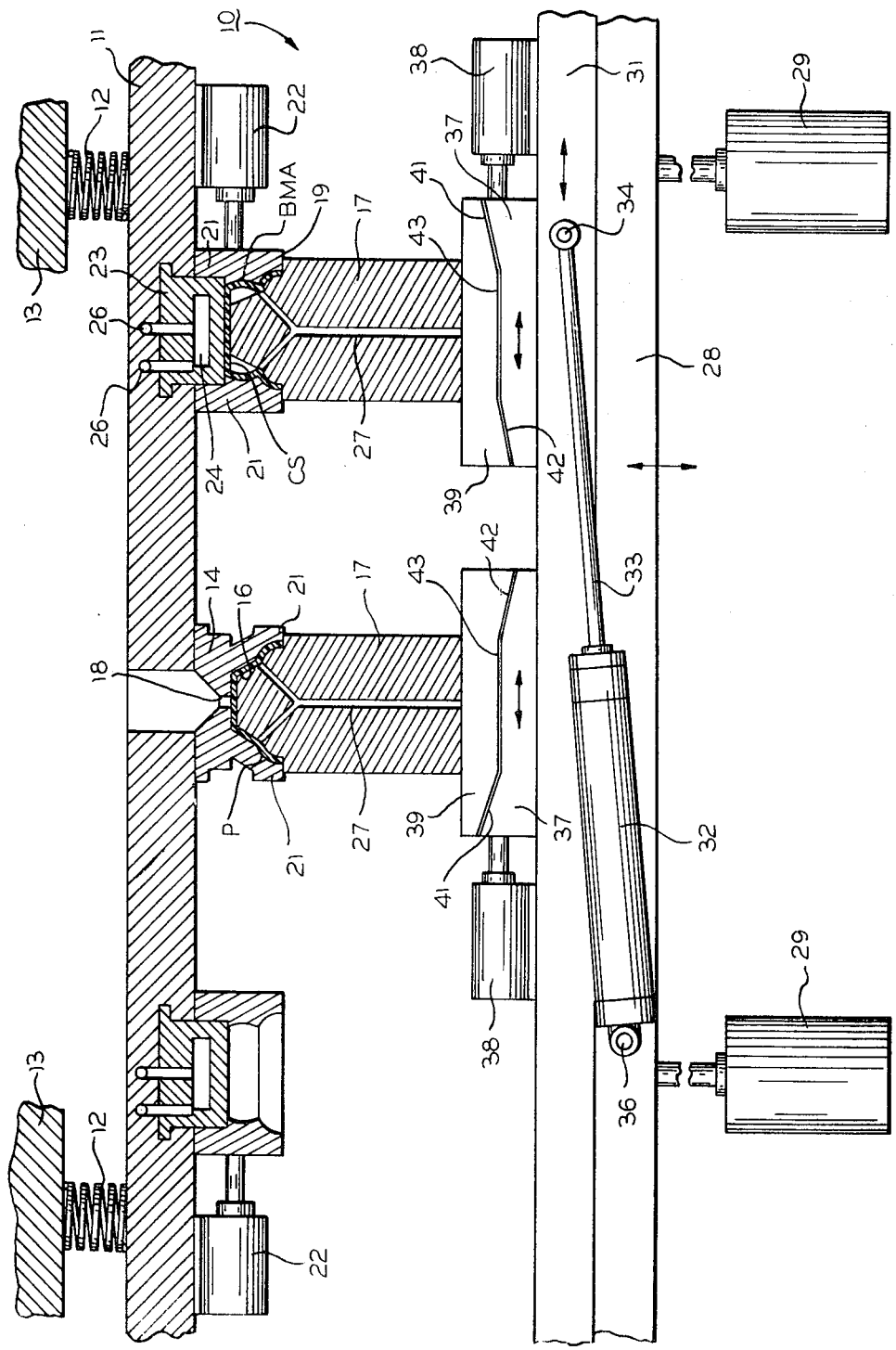
INVENTOR
PASCAL LA GRUTTA
BY
Carpenter, Ostis + Lindberg
ATTORNEYS

COINING STRUCTURES FOR INJECTION-BLOW MOULDING APPARATUS

BACKGROUND OF THE INVENTION

1. Field of the Invention

This invention relates generally to improvements in apparatus where a moulded article is partly formed in an injection moulding step. According to the present invention the excess of material at the sprue of the injection moulding station is caused to merge into the moulded piece by a coining step carried on at the blow moulding station. Such coining operation gives a smooth surface to the moulded piece, or if desired, the coining step can be employed to place any suitable embellishment to a top surface of the moulded piece, all in such a fashion that the sprue material is no linger evident. 2. The Prior Art Gussoni U.S. Pat. No. 3,011,216 best exemplifies moulding apparatus where a moulded article is partly formed at an injection moulding station and then is transferred with the mould core to a blowing station where the parison disposed on the core is blown to complete the formation of the moulded article. In such apparatus the sprue material is evident in the surface of the moulded article.

SUMMARY OF THE INVENTION

The present invention constitutes an improvement over the prior art in that the sprue material is successfully merged into the moulded article in such a fashion that it is no longer evident, this being accomplished by a coining operation taking place before the moulded article is removed from the core and the split blow mould cavity. This is achieved by a camming arrangement consisting of a fixed cam member and a cam movable with respect to the fixed cam member, and arranged to move the core in a direction toward the top of the blow mould with the moulding material therebetween.

THE DRAWING

The single FIGURE is a schematic plan view of a moulding machine having coining structure in accordance with the present invention.

The improved apparatus according to the present invention is found in the environment of a moulding machine shown schematically and referred to by the reference numeral 10. The apparatus includes a fixed stack 11 having springs 12 disposed between the fixed stack 11 spaced between abutments 13. The fixed stack 11 supports an injection mould 14 mounted on the center line of the moulding machine 10 and the fixed stack 11. Injection mould 14 has a mould cavity 16 which cooperates with a core 17 spaced from the walls of the cavity 16, so that when moulding material entering cavity 16 by means of a sprue passage 18 a parison P is formed between core 17 and the walls of mould cavity 16.

A blow mould 19 is also secured to the fixed stack 11, and is spaced from the injection mould 14. Blow mould 19 comprises a pair of mould halves 21 which are moved against a mould top 23 by an operating cylinder 22. The latter is adapted to separate mould halves 21 at he conclusion of a blow moulding operation.

Mould top 23 has chilling chambers 24 therein and passage ways 26 providing chilling fluid for a moulded article in blow mould halves 21.

Core 17 has a blowing passage 27 therein which acts upon parison P when at the blow mould 19 to blow against the interior of same to cause parison P to be blown to provide a blow moulded article BMA.

The structure thus far described comprises a pair of cores 17 arranged to move as a pair laterally to be alternately located at left-hand blow mould 19 and then at right-hand blow mould 19.

Structure is also provided for moving the cores 17 in direction toward and away from injection mould 14 and blow moulds 19 to initiate and complete a moulding sequence. A movable stack 28 is accordingly provided so that the cores 17 may alternately first cooperate with the injection mould 14 and then move to the left or the right to the blow moulds 19, as the case may be, to blow parison P thereon.

The movable stack 28 is movable in directions toward and away from the fixed stack 11 by a pair of fluid operated cylinders 29.

Structure is provided for moving the cores 17 laterally of the fixed stack 17 and with respect to movable stack 28, and a slide 31 supporting the cores 17 is mounted for sliding movement with respect to he movable stack 28 by means of a fluid operated motor 32. The latter has a piston rod 33 pivotly connected to an abutment 34 on the slide 31, the other end of the fluid motor 32 being pivotly connected to 36 to movable stack 28.

Each of the cores 17 and the underside of the blow mould top 23 is provided with a coining surface CS to minimize the appearance of sprue injection material. Structure is accordingly provided for giving a small increment of movement in an axial direction to the core 17 when at the blow cavity 19 to provide a coining surface CS on the outside of the blow moulded article BMA, or on the inside thereof, or both as desired. To this end the cores 17 are given such small increment of movement by a movable cam 37 arranged to slide with respect to the slide 31. Each of the cams 37 is movable by a fluid motor 38, and the movable cam 37 cooperates with a cam follower 39 rigidly secured to the lower end of the core 17. The movable cam 37 and the cam follower 39 have cooperating ramp surfaces 41 and 42, these being separated by cooperating slide surfaces 43. In the case of the right-hand core 17, the same is given the small amount of movement in an axial direction by the right-hand fluid operated motor 38, causing the follower 39 to ride up along the ramp surfaces 41 and 42. In the same fashion left-hand core 17 is given the same kind of movement.

The structure, not shown, is preferably provided to remove the blow moulded article from the core at the conclusion of the blow moulding operation. Such structure is well known in the art, and accordingly not necessary for description herein.

I claim:

1. In an injection-blow mould apparatus having:
   a. a stationary stack including:
      i. an injection mould;
      ii. a blow mould having a cavity presenting a coining surface therein;
   b. a core;
   c. means for injecting a quantity of moulding material into a mould cavity defined by said injection mould and said core to form a partly completed moulded article;
   d. a vertically movable stack;
   e. a slide member, for supporting said core, positioned on said movable stack for relative lateral movement thereon;
   f. means for moving said movable stack and slide member in directions to transfer said core and the partly moulded article thereon to said blow mould;
   g. means operable to blow said article to a dimension determined by said blow mould;
   h. the improvements in said apparatus comprising means operable between said movable stack and said core for moving said core axially a small increment to urge said core against said mould cavity coining surface to coin that part of the blown article between the end of said core and said blow mould including:
      i. a cam mounted on said slide member for movement therewith;
      ii. a cam follower connected to said core and positioned adjacent said cam for cooperation therewith;
      iii. fluid pressure means connecting said slide member to said movable stack for moving the former on the latter and thereby providing camming action between said cam and said cam follower.

* * * * *